June 7, 1932. S. H. NORTON 1,862,196

LOCKING DEVICE FOR SLIDE FASTENERS

Filed May 31, 1930

INVENTOR.
Samuel H. Norton.
BY R. S. Kelley
ATTORNEYS.

Patented June 7, 1932

1,862,196

UNITED STATES PATENT OFFICE

SAMUEL H. NORTON, OF MEADVILLE, PENNSYLVANIA

LOCKING DEVICE FOR SLIDE FASTENERS

Application filed May 31, 1930. Serial No. 457,847.

My invention relates to slide fasteners and particularly to locking devices for preventing relative movement between the slider and fastener stringers.

When slide fasteners are applied to articles where they are continuously subjected to an opening strain such as in footwear, leggings, sweaters, corsets and other wearing apparel, there is a tendency for the slider to slip back along the stringers and permit the fastener to open up, unless means are provided to prevent such slipping movement.

Various slider locking devices have been heretofore proposed to maintain the fastener closed by preventing relative movement between the slider and fastener stringers. In one practical embodiment of such locking devices, an opening is cut in the wing of the slider and a prong or lug on the slider actuating member or pull projects through the opening into engagement with the fastener elements in one position of the pull. These locking devices are exceedingly simple in construction and have been found satisfactory in articles where the slider is moved upwardly to close the fastener and downwardly to open the fastener or even when the fastener is arranged in approximately a horizontal position. However, when such locking devices are applied to articles where the fastener is in an upside down position wherein the slider is disposed at the lower end of the fastener when closed, there will be a tendency for the pull to swing downwardly out of locking position.

One of the objects of my invention is therefore to provide a very simple and effective retaining means for holding the pull in locking position against the influence of gravity or accidental displacement in any position of the fastener.

Another object of the invention is to provide a resilient connection between the locking device and its point of attachment to the slider and to incorporate such feature in a slider lock of the type above mentioned.

Other objects and advantages of the invention will appear more fully in the following specification.

In the accompanying drawing, I have shown for purposes of illustration one embodiment and two modifications thereof which my invention may assume in practice.

Figure 1:
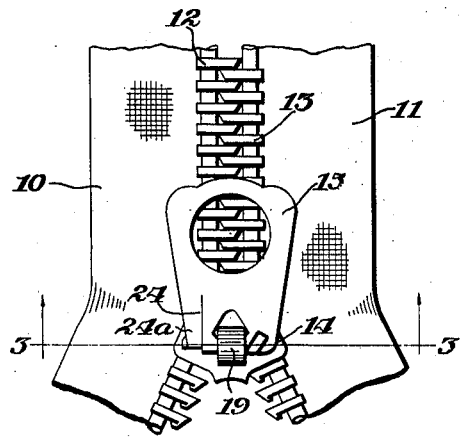
Fig. 1 is a face view of a portion of a slide fastener with its open end disposed downwardly or in an "upside down" position and having my improved locking device associated therewith.

The fastener may be of any known type and as illustrated in Fig. 1, comprises a pair of fabric stringers 10 and 11 having endwise engaging fastener elements 12 and 13 secured to their adjacent longitudinal edges. The detailed construction of these fastener elements will not be included here it being deemed sufficient to make reference to the patent to Gideon Sundback No. 1,219,881, March 20, 1917, which shows an early example of this type of fastener. The fastener elements 12 and 13 are engaged and released by the movement of a slider 14 along the stringers, the slider being actuated to close or open the fastener by a pull 15.

Figure 3:
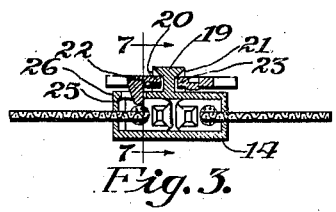
Fig. 3 is a transverse sectional view through the slider and fastener on line 3—3 of Fig. 1.
Figure 7:
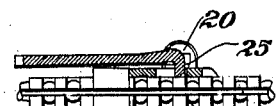
Fig. 7 is a longitudinal sectional view on line 7—7 of Fig. 3.

The slider comprises spaced upper and lower wings 16 and 17 respectively connected by a neck portion 18 at the rear end of the slider, the upper wing having an integral pull attaching lug 19 formed thereon at any suitable point. As best seen in Fig. 3, this lug 19 is indented on opposite sides as at 20 and 21 to form recesses for receiving the pivot extensions 22 and 23 on the pull. The pull is preferably formed of a flat piece of sheet metal blanked to the desired shape and along one edge has a slit 24 providing a spring-like locking member having a locking projection or lug 25 which extends at substantially right angles to the pull and projects through an opening 26 in the top wing of the slider, and engages in the spaces between the locking members 12 to lock the slider against movement relative to the fastener elements. The action of the spring-like locking member will be readily understood. As shown in Fig. 7 when the slider stops at certain points and the pull is depressed into locking position, the prong 25 may engage on the edge of one of the fastener elements and will ride over it, at the same time flexing the spring-like extension 24a. Now upon a slight movement of the slider, it will be readily seen that the locking tongue will snap into engagement with one of the spaces between the fastener elements securely locking the slider. The spring-like extension is conveniently formed by providing a slit approximately parallel to one side edge of the pull and preferably the locking point 25 is located substantially in line with the pivotal axis of the pull instead of extending beyond the pivot from the body of the pull.

Figure 4:
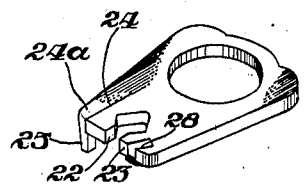
Fig. 4 is a perspective view illustrating the pull made according to my invention.

In order to retain the pull 15 in locking position when applied to a fastener where the open end is down, such as in corsets and the like, a detent 27 is formed on the end of the pull adjacent its pivotal axis and preferably very close to the pull attaching lug. This detent may be formed as in Figs. 4 and 5 by a suitable punch and die which displaces the metal from the pull after forming and leaving the recess 28.

Figures 8, 9, 11:
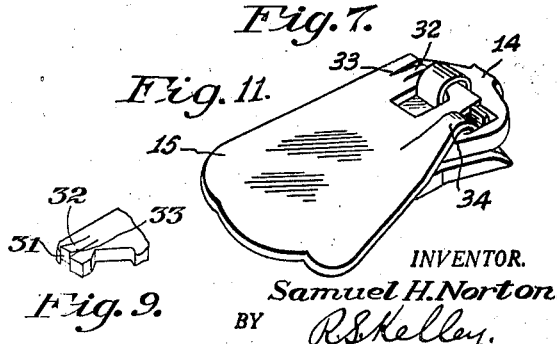
Fig. 8 is a fragmentary view of a portion of the pull similar to Fig. 5 showing a modification.
Fig. 9 is a similar view of the pull showing another modification.
Fig. 11 is a perspective view of the slider and pull member showing the pull construction of Figs. 9 and 10, collectively in the same device.

As shown in Fig. 8 the detent is formed in a slightly different manner. In the blanking out punch for the pulls, a small recess is formed in the punch die and the metal simply flows into this recess during the punching action to form the detent projection 29. Thus no substantial recess corresponding to the recess 28 is formed on the pull and its visible surface remains smooth.

The action of this detent projection will now be pointed out. When the pull is depressed this projection will cam over the smooth surface of the slider and the inner extensions 22 and 23 of the pull will bear against the beveled top surfaces of the indentations or recesses 20 and 21 in the pull attaching lug, thus causing the bifurcated end of the pull to spring apart slightly. A spring effect is thus obtained which will cause the the pull to snap down against the slider and be held effectively in locking position.

In the modification shown in Fig. 9 the detent member 31 is formed as a part of a spring tongue 32 formed by slitting the pull at 33 on the opposite side of the pivot from the slit 24. A more flexible spring action is thus obtained on the retaining detent and it will not wear as much as the detent 27.

As a result of my invention it will be observed that an improved and simplified means has been provided for retaining the pull of a slide fastener in locking position regardless of whether or not the fastener is disposed with its open end downwardly. It will also be seen that an improved locking tongue has been provided which will snap into the spaces between the fastener elements and not be liable to break off; also that the locking point or prong is disposed on the transverse line of pivot of the pull whereby it will swing in a smaller arc than in some former constructions where the locking lug was located at the rear of the pivot.

Figures 5, 10:
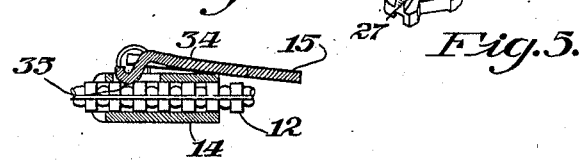
Fig. 5 is a view of a part of the pull in the reverse position from that shown in Fig. 4.
Fig. 10 is a longitudinal section illustrating a still further modification.
Figure 2:
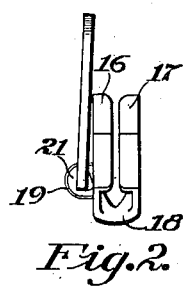
Fig. 2 is a side view of a slider constructed according to my invention.
Figure 6:
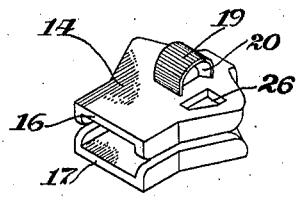
Fig. 6 is a perspective view of the slider with the pull removed.

In Fig. 10 the locking device is modified by providing a comparatively long spring tongue 34 which is bent up to form a curved engaging end 35 in the nature of a friction shoe. Such friction shoe may be made to engage more than one fastener element if desired and provides an effective lock for the slider.

While I have in this application specifically described a few embodiments which my invention may assume in practice, it will be understood that these embodiments are merely for the purposes of illustration and description and that various other forms may be devised within the scope of my invention as defined in the appended claims.

What I claim as my invention is:

1. In a slide fastener, cooperating series of fastener elements, a slider for engaging and releasing said elements, a slider locking device to prevent unintended movement of the slider relative to the stringers, a member pivoted to the slider connected to said locking device for controlling the same, and a spring tongue on said pivoted member which cooperates with said slider to retain said pivoted member in locking position against accidental displacement.

2. In a slide fastener, cooperating series of fastener elements, a slider movable along said elements to engage the same, a sheet metal pull pivotally attached to said slider, a spring extension along one side edge of said pull comprising a tongue integrally joined to the pull at one end and separated from the body of the pull by a longitudinal slit, and a locking projection on said spring extension adapted to project through an opening of the slider into engagement with said fastener elements to prevent opening movement of the slider.

3. In a slide fastener, cooperating series of fastener elements, a slider movable along said elements, to engage and release the same, a pull pivoted to said slider and having a bifurcated attaching end, a locking device for said slider operatively connected to said pull so as to be moved to locking position when the pull is pushed against the slider, a pull retaining detent on said pull adapted to bear against the slider to hold the pull in locking position, a lug on said slider having inclined surfaces, and pivot extensions on the bifurcated end of the pull cooperating with said inclined surfaces to spring apart said bifurcated end when the pull is moved to locking position.

4. In a slide fastener, cooperating series of fastener elements, a slider movable along said elements to engage and release the same, a pull pivoted on the slider, a locking projection on said pull adjacent its pivot adapted to swing into engagement with said fastener elements to lock the slider in inoperative position of the pull, and a spring tongue carried by said pull having its free end adjacent said pivot adapted frictionally to engage the slider to retain said pull in locking position.

In testimony whereof I affix my signature.

SAMUEL H. NORTON.